United States Patent

Willmer et al.

[15] 3,662,103

[45] May 9, 1972

[54] FACSIMILE APPARATUS

[72] Inventors: John Stanley Willmer, Chaldon; Francis Maurus Anderson, Beckenham, both of England

[73] Assignee: Muirhead Limited, Beckenham, Kent, England

[22] Filed: Aug. 5, 1969

[21] Appl. No.: 847,602

[30] Foreign Application Priority Data

Sept. 20, 1968 Great Britain ....................44,843/68

[52] U.S. Cl. ....................178/7.6

[51] Int. Cl. ....................H04n 1/14

[58] Field of Search ....................178/7.6, 6.6; 346/139 A; 179/100.2 B

[56] References Cited

UNITED STATES PATENTS

| | | | |
|---|---|---|---|
| 2,587,145 | 2/1952 | Grib | 346/139 D |
| 2,792,448 | 5/1957 | Deuth et al. | 346/139 A |
| 2,647,168 | 7/1953 | Rivas | 179/100.2 B |

*Primary Examiner*—Richard Murray
*Assistant Examiner*—Barry Leibowitz
*Attorney*—Holman & Stern

[57] ABSTRACT

Facsimile scanning apparatus is provided with two carriages which move in antiphase with one another along parallel rails and respectively scan alternate lines. The two carriages are interconnected by a tensioned inextensible loop passing around a pulley at one end of the rails. The pulley is movable towards and away from the rails so that the phase relationship of the carriages may be adjusted while the apparatus is in use, thus ensuring that the desired 180° antiphase relationship necessary for good facsimile reproduction can be attained quickly and easily.

7 Claims, 1 Drawing Figure

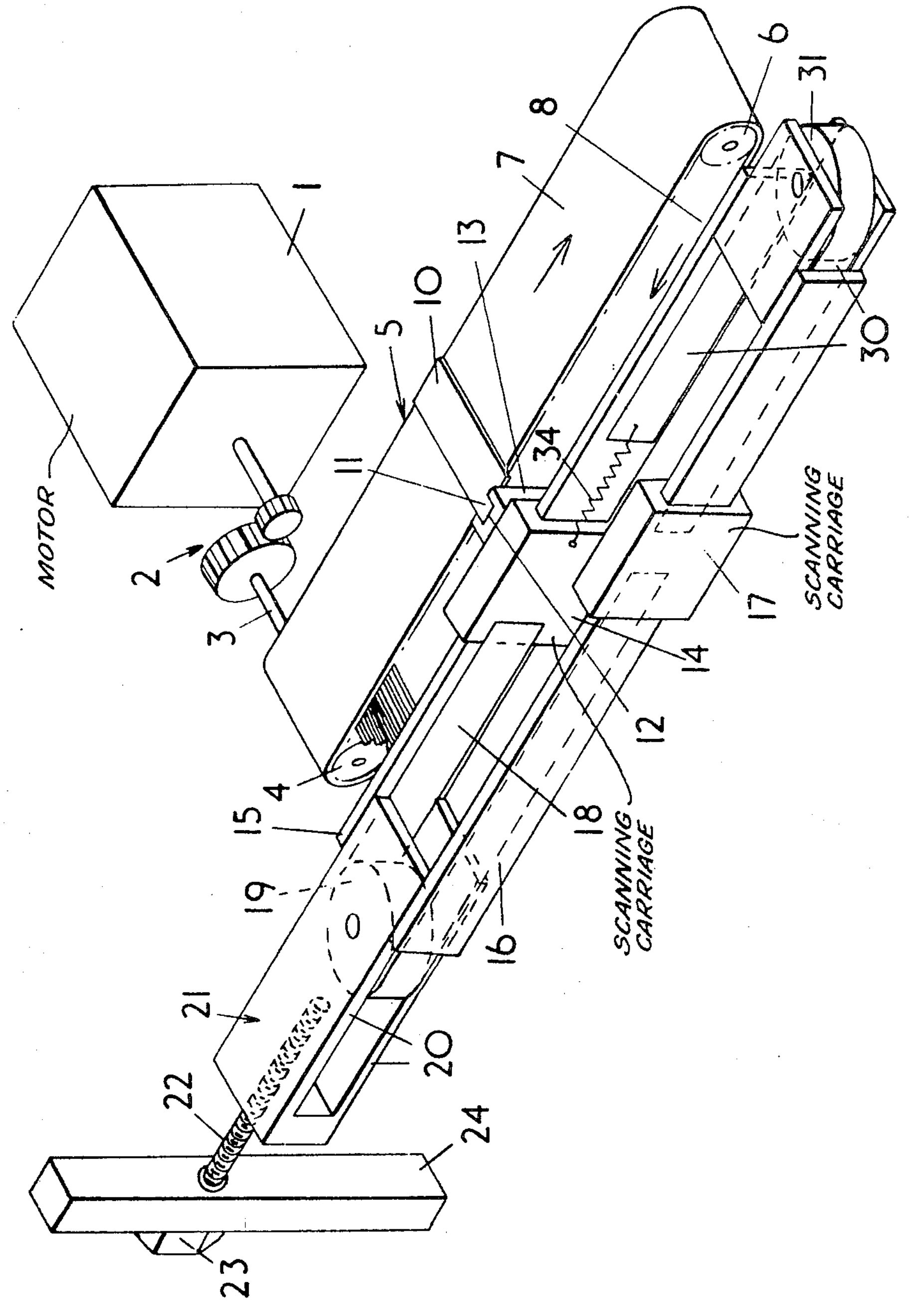
INVENTORS
JOHN STANLEY WILLMER
BY Holman, Glascock, Downing & Seebold
ATTORNEYS

FACSIMILE APPARATUS

This invention relates to facsimile apparatus and is more specifically concerned with an improvement in or modification of a scanning assembly which may be arranged as described in commonly assigned copending application Ser. No. 810,111 filed Mar. 25, 1969.

In the copending application there is described facsimile apparatus mounted on a carriage movable along a straight rail and positionally controlled by a reciprocating drive having its oppositely directed strokes obtained, respectively, from forward and return runs of a belt loop adapted to be continuously driven in one direction by a constant speed motor.

That application also describes in more detail a form of facsimile apparatus in which a facsimile transmitter is provided with a scanning system having two scanning assemblies fixed at speed positions on an inextensible band forming an elongated loop running over pulleys and reciprocated back and forth between the pulleys by a member extending laterally away from a drive loop extending alongside the band and adapted to be driven continuously in one direction by a constant speed motor so that the forward and return movement of the member as it travels along respective runs of the drive loop produce reciprocation of the band and thus the two scanning assemblies in respectively opposite directions. The scanning assemblies are preferably mounted on respective spaced parallel rails.

An advantage of the scanning assembly described in the previous application is that it may be incorporated into a facsimile transmitter, a facsimile receiver or a combined facsimile transmitter/receiver and it enables a relatively high speed of transmission and reception of facsimile data to be achieved as a result of the use of moving carriages without flyback time being lost.

The present invention is concerned with improving a scanning assembly utilizing two carriages connected by an inextensible band, to enable adjustments of the relative positions of the two carriages to be made while the scanning assembly is actually working. As far as the applicants are aware, no facsimile apparatus has been proposed hitherto which is capable of being adjusted when working.

In accordance with the present invention facsimile apparatus having a scanning assembly comprises two carriages each having a facsimile scanning head and reciprocable back and forth in unison and in antiphase on respective parallel tracks by a reciprocating drive coupled to one of the carriages whose motion is transmitted to the other carriage, to reciprocate it in the opposite direction, by an inextensible tensioned band which passes around a pulley displaceable parallel to its axis by an adjustment device to vary the position of said other carriage with respect to said one carriage.

The inextensible band preferably takes the form of a cable which, being inextensible, transmits any movement of the adjustment pulley around which it runs to the carriage which is not coupled to the reciprocating drive. In this way the two carriages may be moved with respect to one another to alter the positions of commencement of their scanning lines to enable the scanning assembly to be lined up prior to use. As the axis of the adjustment pulley is moved parallel to itself the lining up can take place while the scanning assembly is running.

The invention will now be described in more detail, by way of example, with reference to the accompanying drawing which shows schematically and in perspective a scanning assembly of a facsimile apparatus which may be a transmitter or a receiver or a combined transmitter and receiver.

The scanning assembly shown in the drawing is driven by a constant speed motor 1 whose drive is transmitted through reduction gearing 2 to a shaft 3 on which is fixed a toothed pulley 4. A broad ribbed belt 5 runs around the toothed pulley 4 and around a toothed idler pulley 6 to provide forward and return belt runs 7 and 8 respectively. Arranged across the broad belt 5 is a cross-plate 10 provided at one end with a finger 11 which extends into a guide slot 12 formed in a channel guide 13 fixed to a carriage 14. The carriage 14 is slidable along a straight rail 15 which extends parallel to the direction of scan.

A second rail 16 parallel to the rail 15 supports a second carriage 17 which is slidable along it and which is connected to the first carriage 14 by an inextensible band 18 which runs around a pulley 19 disposed between one pair of ends of the rails 15 and 16. The pulley 19 is rotatable between a pair of flanges 20 of a member 21 which is threaded to receive a bolt 22. The bolt has a bolt head 23 disposed on one side of a bar 24 fixed to the frame of the apparatus and therefore immovable. Rotation of the bolt head 23 moves the member 21 towards or away from the bar 24 in accordance with the direction of rotation of the bolt, and this, in turn, produces a displacement of the pulley 19 parallel to its axis. Elements (not shown) are provided to prevent the member 21 rotating when the bolt head 23 is turned.

The two carriages 14 and 17 are connected at their other sides by a second inextensible band 30 which runs around a fixed pulley 31 and is connected by a tension spring 34 to the carriage 14.

The carriages 14 and 17 may each carry a facsimile transmitting head, a facsimile receiving head, or a facsimile transmitting and facsimile receiving head. The nature of the facsimile heads carried by the carriages plays no part in the present invention but various parts of it are described in detail in copending application Ser. No. 810,111.

The scanning assembly operates as follows.

The motor 1 runs continuously in one direction and produces a unidirectional movement of the broad belt 5. The cross-plate 10 is rigidly attached to the belt so as to extend at right angles to it and travels alternately on the forward run 7 and the return run 8 of the belt 5. As the cross-plate 10 travels with the belt 5 the finger 11, which is a close sliding fit in the channel guide 13, moves the carriage 14 to and fro along the rail 15. At opposite ends of the belt runs the finger 11 moves vertically around the pulleys 4 and 6 and such a movement is accommodated by the length of the guide slot 12. The belt 5 together with the slot 12 and finger 11 thus provide a drive for reciprocating the carriage 14.

The reciprocating motion of the carriage 14 is transmitted by the inextensible flexible band 16 to the carriage 17 which therefore travels in unison with the carriage 14 but in antiphase to it. The band 16 is maintained in tension by the second band 30 travelling around the pulley 31 and which is provided with the tensioning spring 34.

As previously stated, the two carriages are provided with facsimile heads which carry out, alternately, successive scans. As successive scans are performed by alternate carriages it is necessary for the two carriages to be lined up with one another so that they each commence their scan at a position directly beneath the commencement of the scan previously performed by the other carriage. This lining up is done by adjusting the bolt 22.

It will be appreciated that the position of the carriage 14 is fixed by the engagement of the guide channel 13 with the finger 11 driven by the belt loop 5. If the movable pulley 19 is moved by the adjustment bolt 22 away from the rails 15 and 16, each half millimeter of movement will produce one millimeter of movement of the carriage 17 in the same direction. In this way the position of commencement of the scan of the carriage 17 may be altered without varying the position of commencement of the scan of the carriage 14 and such adjustment may take place while the scanning assembly is actually running. During such adjustment the inextensible band 18 is maintained in tension by the tension spring 34 connecting the other band 30 to the carriage 17 and running around the fixed pulley 31.

We claim:

1. Facsimile apparatus including a scanning assembly, two carriages in said scanning assembly, a facsimile scanning head in each carriage, two parallel tracks defining paths of movement for said carriages respectively, a pulley having an axis of rotation, an inextensible flexible tensioned band passing around said pulley and connected at its opposite ends to respective carriages to move them in antiphase with one another, tensioning means acting on said carriages and maintaining said band in tension, a drive coupled to one of the carriages and operating to move the carriage back and forth along its rail, and an adjustment device operable to displace the pulley axis parallel to itself whereby the relative positions of the two carriages on their respective tracks may be altered.

2. Apparatus as set forth in claim 1, in which said pulley is disposed at one end of a pair of rails providing said tracks and is displaceable towards and away from the ends of said rails.

3. Apparatus as set forth in claim 2, in which said band comprises a stainless steel cable.

4. Facsimile apparatus including a scanning assembly, two carriages in said scanning assembly, a facsimile scanning head in each carriage, two parallel tracks defining paths of movement for said carriages respectively, a first pulley having an axis of rotation, an inextensible flexible tensioned band passing around said first pulley and connected at its opposite ends to respective carriages to move them in antiphase with one another, a second pulley, a flexible tensioned expandible second band passing around said second pulley and connected at opposite ends to respective carriages said second band extending away from said carriages on the opposite sides thereof to said first band, a drive coupled to one of the carriages and operating to move the carriage back and forth along its track, and an adjustment device operable to displace said first pulley axis parallel to itself whereby the relative positions of the two carriages on their respective tracks may be altered.

5. Apparatus as set forth in claim 4, in which the second band is formed by a stainless steel cable connected in series with a spring and passing around said second pulley which is mounted adjacent one set of ends of rails providing said tracks, said first pulley being mounting adjacent the other ends of said rails.

6. Facsimile apparatus including a scanning assembly, two carriages in said assembly, a facsimile scanning head in each carriage, two parallel tracks defining paths of movement for said carriages respectively, a first pulley having a displaceable axis of rotation, an inextensible flexible tensioned band passing around said first pulley and formed by a stainless steel cable connected at its opposite ends to respective carriages to move them in antiphase with one another, a second pulley, a flexible tensioned expandible second band formed by a stainless steel cable connected in series with a spring and passing around said second pulley said second band being connected at opposite ends to respective carriages and extending away therefrom on the opposite side to said first band, a drive coupled to one of the carriages and operating to move the carriage back and forth along its track, a belt loop forming part of said drive, a constant speed electric motor driving said belt loop, a cross-member extending transversely away from one side of said belt loop, a sliding coupling interconnecting said cross-member with said one carriage to produce forward and return strokes thereof with rotation of said belt, a threaded member providing an adjustment device operable to displace the first pulley axis parallel to itself and parallel to the longitudinal axes of said rails whereby the relative positions of the two carriages on their respective tracks may be altered.

7. Facsimile apparatus as set forth in claim 6, in which the adjustment device comprises a screw extending parallel to said rails and passing through a threaded hole fixed in relation to said apparatus said first pulley having its rotational axis fixed to one end of said screw.

* * * * *